United States Patent
Ito et al.

(10) Patent No.: US 7,002,515 B2
(45) Date of Patent: Feb. 21, 2006

(54) GPS RECEIVER USING SOFTWARE CORRELATION FOR ACQUISITION AND HARDWARE CORRELATION FOR TRACKING

(75) Inventors: Toshiyuki Ito, Toyohashi (JP); Katsuhiko Mutoh, Toyota (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/037,428

(22) Filed: Jan. 17, 2005

(65) Prior Publication Data

US 2005/0162313 A1    Jul. 28, 2005

(30) Foreign Application Priority Data

Jan. 26, 2004  (JP) ............................. 2004-017037

(51) Int. Cl.
    *G01S 5/14*         (2006.01)
(52) U.S. Cl. ............................. 342/357.15; 342/357.12
(58) Field of Classification Search ........... 342/357.15, 342/357.12
    See application file for complete search history.

(56) References Cited

U.S. PATENT DOCUMENTS

| 6,816,113 B1 * | 11/2004 | Caswell et al. ......... 342/357.15 |
| 6,873,910 B1 * | 3/2005 | Rowitch et al. ....... 342/357.12 |
| 2002/0015456 A1 * | 2/2002 | Norman et al. ............ 375/340 |

* cited by examiner

*Primary Examiner*—Thomas H. Tarcza
*Assistant Examiner*—Fred H. Mull
(74) *Attorney, Agent, or Firm*—Harness, Dickey & Pierce, PLC

(57) ABSTRACT

A GPS receiver includes a CPU for synchronously acquiring the GPS satellites by using software correlating and a hardware section composed of multiple hardware correlating units that execute a correlating process for tracking the GPS satellites synchronously acquired by the CPU. Increase in a product size due to tracking can be thereby suppressed in the GPS receiver that synchronously acquires the GPS satellites by the software correlating.

4 Claims, 2 Drawing Sheets

GPS RECEIVER USING SOFTWARE CORRELATION FOR ACQUISITION AND HARDWARE CORRELATION FOR TRACKING

CROSS REFERENCE TO RELATED APPLICATIONS

This application is based on and incorporates herein by reference Japanese Patent Application No. 2004-17037 filed on Jan. 26, 2004.

FIELD OF THE INVENTION

The present invention relates to a global positioning system (GPS) receiver.

BACKGROUND OF THE INVENTION

A technology is known that a GPS receiver uses multiple hardware correlating units to thereby increase a speed in synchronous acquisition for the GPS satellites. In such a GPS receiver using the multiple (or multiple-channel) hardware correlating units, a time period required for the synchronous acquisition decreases as the number of hardware correlating units increases. However, in the GPS receiver that includes hundreds or thousands of hardware correlating units so as to shorten the time period for the synchronous acquisition, a large number of hardware correlating units poses disadvantage such as increase in an LSI size, or manufacturing costs. Tracking the GPS satellites posterior to completing of the synchronous acquisition does not need as many as the hardware correlating units required for the synchronous acquisition. Therefore, the above large number of hardware correlating units is only needed for the synchronous acquisition that is mainly executed in starting powering.

To avoid this disadvantage and also achieve the high speed in the synchronous acquisition, a software correlating technology is proposed for use in a GPS receiver. In this technology, a certain amount of necessary signal data for the synchronous acquisition is obtained from the GPS satellites to then be stored in a memory, and the stored data is used by a CPU for a correlating process in a software manner (software correlating) so as to execute the synchronous acquisition and tracking.

Note that the synchronous acquisition that does not need to be repeatedly executed when it is executed once whereas the tracking is a real-time process so that repeated execution should be required at milliseconds of intervals. In the inventors' investigation, such high-frequency tracking is not easily achieved in the above software manner by a CPU of the present processing speed. If it is achieved, an excessively high performance CPU is required, so that manufacturing costs or a product size should be increased.

SUMMARY OF THE INVENTION

It is an object of the present invention to provide a GPS receiver that executes synchronous acquisition for GPS satellites by software correlating while avoiding increase in a product size because of tracking.

To achieve the above object, a GPS receiver is provided with the following. A first correlating section is included for synchronously acquiring GPS satellites by using software correlating. A second correlating section that includes a plurality of hardware units is included for executing a correlating process for tracking the GPS satellites synchronously acquired by the first correlating section.

In this structure, the first correlating section does not need to execute a real-time process such as tracking, so that increase in a product size can be suppressed. In a GPS receiver that executes the synchronous acquisition for the GPS satellites in software correlating, increase in a product size due to tracking can be thereby suppressed.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
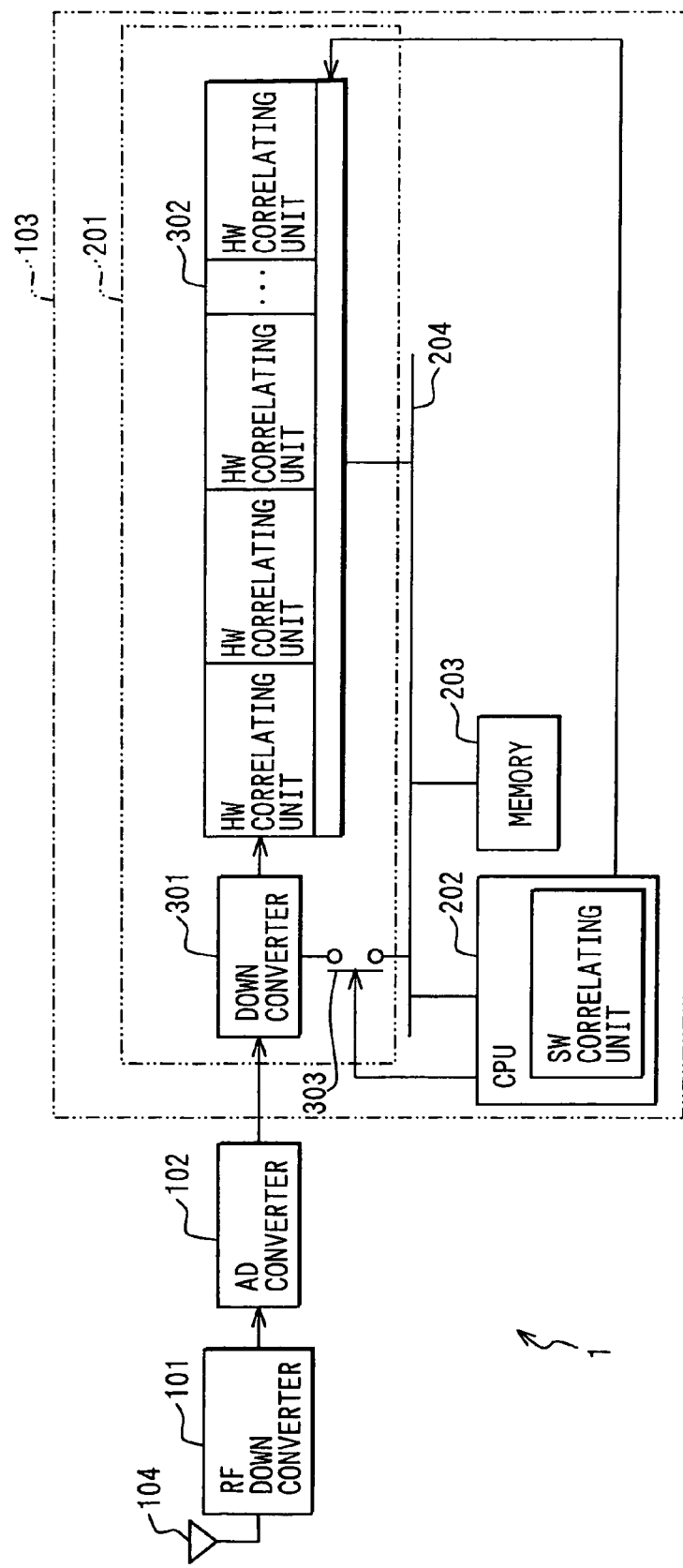
FIG. 1 is a diagram of a hardware structure of a GPS receiver according to an embodiment of the present invention.

A GPS receiver according to an embodiment of the present invention includes an RF down converter 101, an A/D converter 102, a digital signal processing section 103, and an antenna 104, as shown in FIG. 1. The RF down converter 101 performs down converting of RF-band signals from the GPS satellites received by the antenna 104, to IF-band signals, to then output them to the A/D converter 102. The A/D converter 102 then converts the inputted IF-band signals to digital data, to then output it to the digital signal processing section 103.

The digital signal processing section 103 includes a hardware logic section 201, a CPU 202, a memory 203 composed of a ROM and a RAM, and a data bus 204 mediating communications between the foregoing components 201, 202, 203. The hardware logic section 201 includes a down converter 301, a hardware correlating section 302, and an on/off switch 303. The down converter 301 performs down converting of the IF-band digital signals outputted to the hardware logic section 201 by the A/D converter 102, to baseband signals, to then output them to the hardware correlating section 302 and the on/off switch 303.

The hardware correlating section 302 includes multiple (e.g., twelve) hardware correlating units that execute a correlating process for tracking the GPS satellites. The hardware correlating section 302 outputs in parallel to the data bus 204 correlative values using C/A (Coarse Acquisition) codes that have phases different from each other with respect to the baseband signals received from the down converter 301. The on/off switch 303 is controlled by the CPU 202 to switch between ON and OFF, so that the data outputted from the down converter 301 is outputted to the data bus 204 at an ON state while the data is not outputted at an OFF state.

The CPU 202 executes a program read out from the ROM of the memory 203. While executing the program, as needed, the CPU 202 obtains data outputted to the data bus 204; reads data or writes data from or to the memory 203 via the data bus 204; controls the on/off switch 303; and controls operating/stopping of the hardware correlating section 302, the phases of the C/A codes, or the like.

Figure 2:
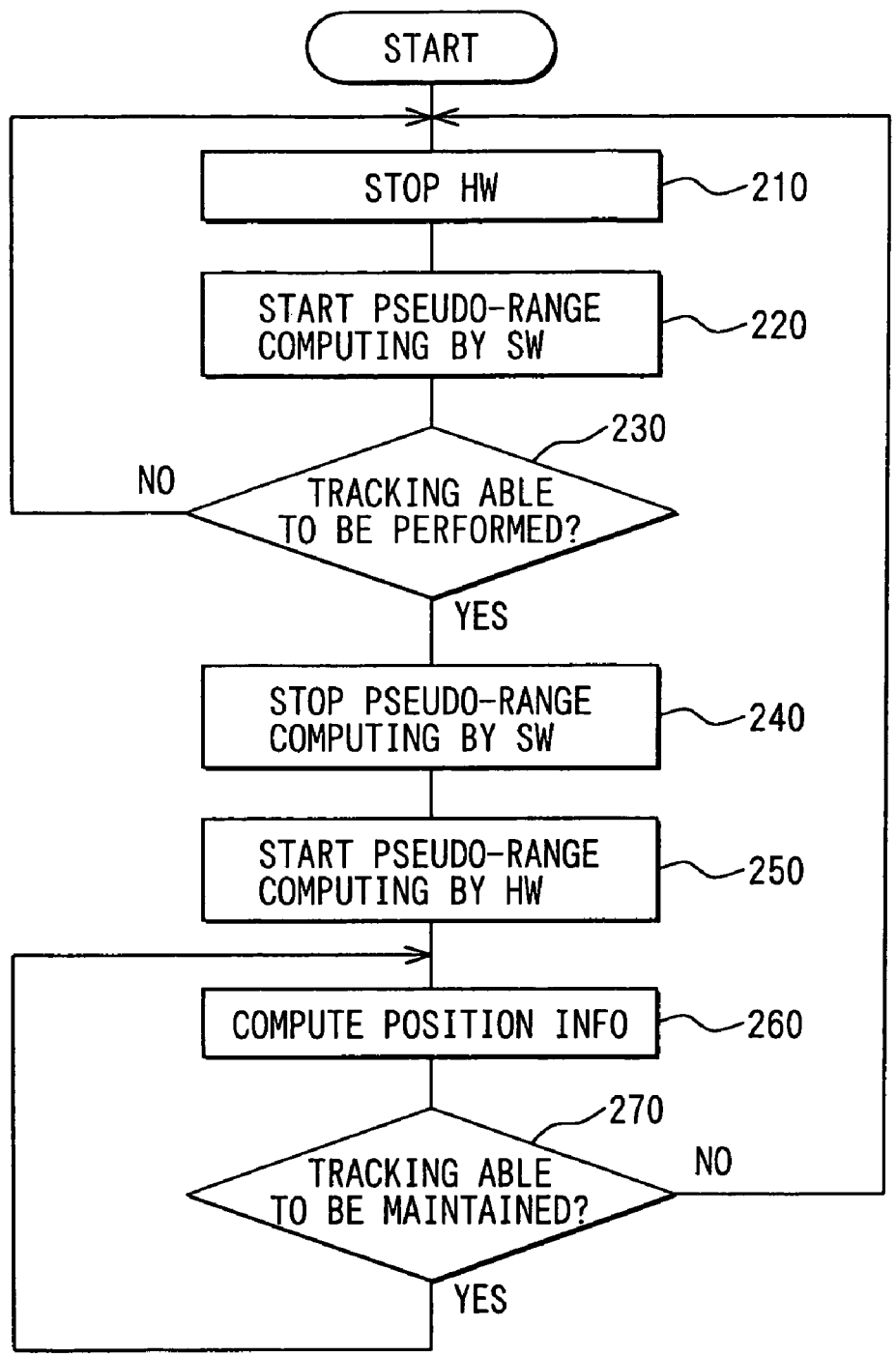
FIG. 2 is a flow chart diagram of a program executed by a CPU according to the embodiment.

Hereinbelow, a flow chart of the program executed by the CPU 202 will be explained with reference to FIG. 2. The CPU 202 consecutively executes this program while being powered to thereby function as a software correlating unit that synchronously acquires the GPS satellites.

At Step 210, to set an operating mode to GPS-satellite acquiring, the hardware correlating section 302, if it operates, is stopped.

At Step 220, a pseudo-range computing is executed by using the software correlating unit. That is, synchronous acquisition for the GPS satellites by the software correlating is executed. Here, the synchronous acquisition includes visible satellite searching, and frequency/phase searching. In detail, the on/off switch 303 is turned on, and then baseband signals outputted from the down converter 301 are stored in the memory 203 for a constant time period (e.g., one second). With respect to the data of the stored baseband signals, correlative values of multiple-phase C/A codes are computed. Among them, the peak phase is selected to thereby compute a pseudo-range.

At Step 230, it is determined whether tracking is able to be performed. That tracking is able to be performed is determined by, e.g., whether the peak phase selected at Step 220 exceeds a given value. When the GPS receiver 1 is located in a place such as a tunnel where data cannot be received from the GPS satellites, it is determined that tracking is unable to be performed.

When tracking is determined to be able to be performed, the processing at Step 240 subsequently takes place so as to change the operating mode to GPS-satellite tracking. In contrast, when tracking is determined to be unable to be performed, the process returns to Step 210 to maintain the GPS-satellite acquiring.

At Step 240, the pseudo-range computing using the software correlating unit is stopped, so that the synchronous acquisition is stopped. In detail, the on/off switch 303 is turned off.

After stopping of the synchronous acquisition, at Step 250, the pseudo-range computing by the hardware correlating section 302 is started. That is, the hardware correlating section 302 is controlled to cause the multiple hardware correlating units to execute correlating processes for tracking the GPS satellites synchronously acquired at Step 220.

At Step 260, position information or the like is computed. In detail, tracking, computing of the pseudo-range, computing of the position information are executed by using the correlative values outputted to the data bus 204 from the hardware correlating section 302 as the result at Step 250.

At Step 270, it is determined whether the tracking is able to be maintained. In detail, it is determined whether the peak of the correlative values outputted from the hardware correlating section 302 exceeds a given value. When the tracking is determined to be unable to be maintained, the process returns to Step 210 for changing the operating mode to the GPS-satellite acquiring. In contrast, when the tracking is determined to be able to be maintained, the process returns to Step 260 to continue the processing at Step 260.

By executing the above program, the CPU 202 determines whether tracking is able to be performed at Steps 230, 270. The CPU 202 then executes the synchronous acquisition for the GPS satellites using the software correlating when tracking is determined to be unable to be performed, whereas causing the hardware correlating section 302 to operate when tracking is determined to be able to be performed.

Under the above process, in the GPS receiver 1, the CPU 202 executes the synchronous acquisition for the GPS satellites by the software correlating, while the hardware correlating section 302 composed of the multiple hardware correlating units executes a correlating process for tracking. Thus, the correlating process for tracking is achieved by the hardware section different from the CPU 202 that synchronously acquires by using the software correlating. Further, the hardware correlating section 302 is composed of the multiple hardware units, so that the CPU 202 does not need to execute a real-time process such as tracking. Increase in the product size can be thereby suppressed. Consequently, in the GPS receiver that executes the synchronous acquisition by using the software correlating, the increase in the product size due to tracking can be suppressed.

Further, tracking does not need a large number of hardware correlating units as in the synchronous acquisition, so that the LSI size or the number of manufacturing steps can be decreased in comparison to a GPS receiver that executes using the hardware units the synchronous acquisition at the similar high speed as that of the embodiment.

Further, for instance, suppose a case where a GPS receiver 1 includes a function of a car navigation system and the CPU 202 executes application programs other than acquiring, tracking, computing of the position information, and the like. In this case, the CPU 202 of this embodiment does not execute a process for computing the correlative values for tracking, so that a possibility of posing the following problems can be decreased. The problems are such that an operation of another application is delayed by competing of the tracking and another program.

Further, the synchronous acquisition is executed in the software manner, so that functions of the synchronous acquisition can be modified or improved by rewriting the relevant program.

Note that operating of the hardware correlating section 302 means that the hardware correlating section is caused to be used for tracking the GPS satellites. Even when the hardware correlating section 302 outputs a correlative value with respect to a signal from the down converter 301, the hardware correlating section 302 is recognized as not operating as long as the CPU 202 does not use the outputted signal.

Further, in the above embodiment, the hardware correlating units execute a correlating process for tracking. However, for instance, this hardware correlating units can be replaced by given multiple CPUs that are different from the CPU 202. Here, the given multiple CPUs can execute tracking by also using software correlating. That is, the correlating process for the tracking only needs to be performed by multiple hardware units like the given multiple CPUs.

It will be obvious to those skilled in the art that various changes may be made in the above-described embodiments of the present invention. However, the scope of the present invention should be determined by the following claims.

What is claimed is:

1. A GPS receiver comprising:
   a first correlating section that synchronously acquires GPS satellites by software correlating; and
   a second correlating section that includes a plurality of hardware units that execute a correlating process for tracking the GPS satellites acquired by the first correlating section.

2. The GPS receiver of claim 1,
   wherein the plurality of hardware units include a plurality of hardware correlating units.

3. The GPS receiver of claim 1,
wherein the first correlating section causes the second correlating section to operate, after completing synchronously acquiring the GPS satellites.

4. The GPS receiver of claim 1,
wherein the first correlating section includes:
- determining means for determining whether tracking is able to be performed;
- acquiring means for synchronously acquiring the GPS satellites by the software correlating when tracking is determined not to be able to be performed; and
- controlling means for causing the second correlating section to operate when the tracking is determined to be able to be performed.

* * * * *